United States Patent [19]

Neefus et al.

[11] Patent Number: 4,753,663

[45] Date of Patent: Jun. 28, 1988

[54] REDUCTION OF WATER SOLIDS CONTRIBUTIONS TO APPARENT COTTON DUST LEVELS THROUGH USE OF SPECIAL WATER IN ATOMIZERS

[75] Inventors: John D. Neefus, Greensboro, N.C.; Frederick M. Shofner, Knoxville, Tenn.

[73] Assignee: Burlington Industries, Inc., Greensboro, N.C.

[21] Appl. No.: 244,912

[22] Filed: Mar. 18, 1981

[51] Int. Cl.[4] .......... B01D 47/00

[52] U.S. Cl. .......... 55/89; 55/97; 261/3; 261/4; 261/115; 210/652

[58] Field of Search .......... 55/84–94, 55/259, 97, 228; 261/DIG. 46, DIG. 15, 115, 4, 3, 13; 57/308; 210/259, 652; 19/66 R, 98, 66 CC, 99; 139/1 R

[56] References Cited

U.S. PATENT DOCUMENTS

| | | | |
|---|---|---|---|
| 787,454 | 4/1905 | Kelly | 55/259 |
| 1,222,541 | 4/1917 | Donham | 55/94 |
| 1,643,717 | 9/1927 | Linon et al. | 57/308 |
| 1,827,530 | 10/1931 | Le Grand | 128/205.26 |
| 2,045,717 | 6/1936 | Mitchell . | |
| 2,967,588 | 1/1961 | Swart . | |
| 3,299,619 | 1/1967 | Terry | 55/89 |
| 3,525,198 | 8/1970 | Neitzel | 55/400 |
| 3,627,032 | 12/1971 | Glad | 261/3 |
| 3,776,530 | 12/1973 | Griffith et al. | 261/DIG. 46 |
| 3,854,468 | 12/1974 | Nozaki | 261/DIG. 15 |
| 3,966,407 | 6/1976 | Zuckerberg et al. | 98/33 |
| 4,005,998 | 2/1977 | Gorman . | |
| 4,067,818 | 1/1978 | Marin . | |
| 4,103,508 | 8/1978 | Apple | 62/92 |
| 4,157,963 | 6/1979 | Jessop et al. | 210/222 |
| 4,257,989 | 3/1981 | Nishikawa | 261/DIG. 46 |
| 4,276,177 | 6/1981 | Smith | 210/259 |
| 4,314,308 | 2/1982 | Faulkner . | |

FOREIGN PATENT DOCUMENTS

| | | | |
|---|---|---|---|
| 581975 | 12/1977 | U.S.S.R. | 55/84 |

OTHER PUBLICATIONS

Hackh, Chemical Dictionary, 3rd Edition (1944), McGraw-Hill, New York, pp. 903, 904, 905.

Textile Research Journal; "Humidifiers as a Source of Respirable Dust in Textile Mills"; Jul. 1980, pp. 454 and 455.

Textile Research Journal, "False Elevation of Cotton Dust Levels by Atomized Water Solids"; Nov. 1980, pp. 699, 700.

*Primary Examiner*—Bernard Nozick

*Attorney, Agent, or Firm*—Nixon & Vanderhye

[57] ABSTRACT

A method of treating the water supplied for humidification of the textile processing room environment (e.g. weaving room) results in reduced apparent cotton dust concentrations, while maintaining or increasing processing efficiency. The water supplied to the humidification system for the processing environment is pure water, such as reverse osmosis water, distilled water, deionized water, demineralized water, etc. Humidification is primarily achieved utilizing atomizers, and a pure water supply can be generated on-site by treating tap water with conventional deionizers or demineralizers.

15 Claims, 1 Drawing Sheet

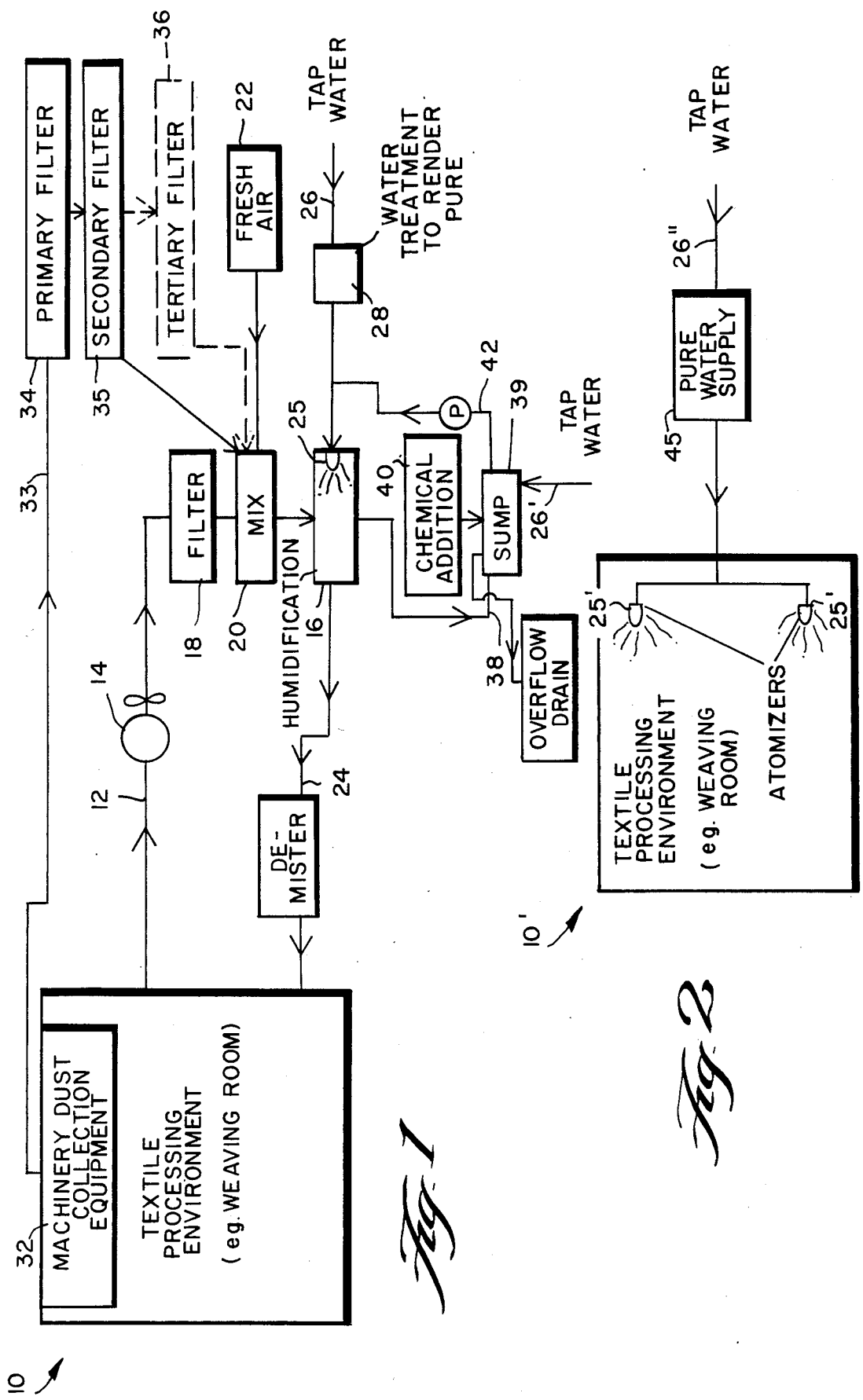

REDUCTION OF WATER SOLIDS CONTRIBUTIONS TO APPARENT COTTON DUST LEVELS THROUGH USE OF SPECIAL WATER IN ATOMIZERS

BACKGROUND AND SUMMARY OF THE INVENTION

In conventional cotton textile processing room environments, such as weaving rooms, traditionally the air has become contaminated with cotton dust. The term "cotton dust" is defined in this art area as any dust present during the handling and processing of cotton through the weaving or knitting of fabrics and dust present in other operations or manufacturing processes using new or waste cotton fibers or cotton fiber by-products from textile mills. Increasing concern has been expressed over the years that such cotton dust is a causative agent of byssinosis, and standards have been promulgated by regulatory agencies (e.g. OSHA) controlling the amount of cotton dust that may be present in a textile processing environment, such as a carding room or weaving room.

Various attempts have been made to reduce the cotton dust level in various environments in order to comply with regulatory standards, and such steps have often involved the purchase and utilization of expensive equipment, particularly dust capturing and filtration equipment such as that attached to individual pieces of machinery. Also, there have been proposals to more thoroughly clean cotton prior to baling and receipt at the textile operation centers. Such techniques have met with mixed succes despite high costs often associated therewith, and the basic changes in textile operations that they involve.

According to the present invention it has been recognized that a large component of the apparent cotton dust levels in textile processing environments is from mineral or other solids in humidification water supplied to the processing environment, as by atomizers and air washers. Such mineral solids in many cases can account for 250 micrograms per cubic meter of air of cotton dust; this alone exceeds the present OSHA standard of 200 micrograms per cubic meter for some textile processing areas.

According to the present invention, it has been found that the mineral component of the apparent cotton dust level can be fantastically reduced, with textile processing efficiency maintained the same or even increased, in a simple and inexpensive manner. The primary thrust of the present invention is to supply low solids content or pure water to the humidification system (e.g. atomizers) for the textile processing room environment. The pure water may be distilled water, demineralized water, deionized water, reverse osmosis water, boiler condensate water, or ultra-filtration water. The term "pure" as used in the present specification and claims encompasses all such types of low solids (dissolved or suspended) water. While of course no water can be completely "pure" (and completely "pure" water could, in fact, be too corrosive of the equipment), it is desirable to utilize water as pure as possible in practicing the present invention, and in any event the water to be considered "pure" within the context of the present specification and claims must be sufficiently free of mineral solids and the like to, when utilized in a humidification system for a textile processing environment, reduce the mineral solids component of cotton dust to acceptable levels. Merely by practicing the simple method according to the present invention, it is possible, for example, to reduce the apparent cotton dust concentration in a weaving room from above 750 micrograms per cubic meter to about 100 micrograms per cubic meter. And, this is sometimes achieved with improved weaving efficiency.

The utilization of deionized or demineralized water in humidification environments in general has been known heretofore, such as shown in U.S. Pat. No. 3,776,530. However such deionization or demineralization has been practiced for other purposes (preventing humidifier clogging, for example), and it has not heretofore been recognized that the utilization of pure water in a textile processing environment can have the unexpected and surprisingly significant reduction in apparent cotton dust level that is possible according to the present invention.

According to one aspect of the present invention, a method of maintaining low apparent cotton dust concentrations and proper humidity in a textile processing room is provided. The method consists essentially of the step of supplying pure water to atomizers which deliver water to the atmosphere in the textile processing room environment. A mineral solids component of apparent cotton dust concentrations is particularly significant in textile processing rooms where atomizers are utilized for humidification, and where the relative humidity must be maintained high (e.g. 80%, as in a weaving room) in order for processing to be effective, although the method is applicable to other humdification systems, such as air washers. Of course the amount of humidification is also dependent upon a number of other variables including the extent to which water vapor is removed from recirculated air by airconditioning (condensation) processes, the extent to which "fresh" air is mixed with recirculated air and the net difference in indoor and fresh water-vapor mass, the particle-size distribution of the aerosol or solids resulting from humidification, and the effective rate of removal of the aerosol or solids by other techniques, such as filtration, settling, or leakage processes. In any event, however, the practice of the present invention can result in extremely significant reductions in the apparent cotton dust level in a textile processing room environment.

According to another aspect of the present invention, a method of maintaining proper humidity within a textile processing room environment is provided. The method comprises the steps of providing a humidification system for the textile processing room environment; providing a source of tap water at the textile processing room environment; treating the tap water from the tap water source at the textile processing room environment to produce pure water; and feeding only pure water, including that obtained from treatment of the tap water to the humidification system for humidifying the textile processing room environment. The treatment step may be effected by demineralizing or deionizing the water, utilizing conventional deionizing and demineralizing equipment.

According to yet another aspect of the present invention, a method of treating the air in a textile weaving room environment is provided. The method comprises the steps of providing atomizers in operative association with the weaving room environment for delivering atomized water into the weaving room atmosphere; and supplying only pure water to the atomizers to be delivered into the weaving room atmosphere.

According to yet another aspect of the present invention a method of conditioning a textile processing room air supply is provided, which supply if unconditioned will result in too high a concentration of cotton dust in the textile processing room, and utilizing an air recirculating system and a humidification system disposed in the air recirculating system. The method comprises the steps of: (a) Withdrawing air from the textile processing room with the air recirculating system. (b) Supplying pure water to the humidification system. (c) Effecting humidification of the air withdrawn from the textile processing room with the pure water delivered to the humidification system; and (d) returning the humidified air to the textile processing room environment. Between steps (a) and (d) the withdrawn air may be filtered and mixed with air from an exterior air source ("fresh" air), and the humidification system preferably comprises a plurality of atomizers to which the pure water is supplied. The pure water is selected from the group consisting essentially of deionized water, demineralized water, distilled water, reverse osmosis water, boiler condensate water, and ultrafiltration water, although any water source providing water of sufficient "purity" for significantly reducing apparent cotton dust concentrations is appropriate.

The invention also has an aspect thereof a method of improving weaving efficiency by humidification of the weaving room atmosphere to a predetermined level with atomizers, the improvement consisting essentially of the step of delivering pure water to the atomizers for humidification of the air.

It is the primary object of the present invention to provide a simple and effective method for reducing the apparent cotton dust concentration in textile processing room environments, while maintaining or increasing textile processing efficiency. This and other objects of the invention will become clear from an inspection of the detailed description of the invention, and from the appended claims.

BRIEF DESCRIPTION OF THE DRAWINGS

FIG. 1 is a schematic drawing illustrating one exemplary manner of practicing a method according to the present invention; and FIG. 2 is a schematic view of another exemplary manner of practicing a method according to the present invention.

DETAILED DESCRIPTION OF THE INVENTION

With reference to the accompanying drawings, a typical textile processing environment is illustrated at 10 in FIG. 1 and at 10' in FIG. 2, such as a weaving room, a carding room or a spinning room. The invention is particularly applicable to those textile processing environments that require high relative humidity (that is where there is no alternative but to artificially humidify the atmosphere), such as weaving, carding and spinning rooms.

In the schematic drawing illustrated in FIG. 1, air is withdrawn for reprocessing from the environment 10 through a conduit 12, as under the influence of a blower 14, and is ultimately passed to an air conditioning system 16, commonly an air washer or the equivalent. Prior to (or subsequent to) humidification within the air recirculating system, the air may be filtered at station 18, and/or mixed with fresh air at station 20, the fresh air being supplied from source 22. Filtration may be accomplished utilizing a V-cell lint-capture system, or other filtration or like treatment apparatus. Mixing in station 20 is accomplished utilizing conventional techniques and apparatus. Ultimately, the treated air is recirculated to the environment 10 through conduit 24.

At the air conditioning station, humidification apparatus will be provided, such as one or more atomizers 25. It is understood that there exist several atomizer means, including single fluid, water pressure driven, two fluid, air pressure driven, spinning dics, and the like. According to the present invention, pure water is supplied to such atomizers 25.

In the embodiment illustrated in FIG. 1, pure water is obtained by providing tap water in line 26 to a water treatment station 28. [The term "tap" as used in the present specification and claims refers to water from conventional municipal or private water systems, or other conventional potable sources.] At the water treatment station the water is rendered pure enough to effect the cotton dust level reduction achievable according to the present invention. For instance the water treatment station 28 may comprise conventional deionizing or demineralizing equipment (see, for example, U.S. Pat. Nos. 3,776,530 and 4,157,963, the disclosures of which are hereby incorporated by reference herein). Only the pure water from the treatment station 28, which may be blended with some tap water as long as the blend itself is "pure" as defined herein, is supplied to the atomizers 25.

Another source of air to be treated is the air from the machinery dust collection equipment, illustrated schematically at 32 in FIG. 1, located in the textile processing room 10. The removed air from equipment 32 passes through conduit 33 to a primary filter 34, secondary filter 35, and optionally a tertiary filter 36, and then to mixing station 20.

In the utilization of a water atomizer, such as the spray nozzles 25, normally there will be excess water, which passes into line 38 and subsequently to sump 39. At sump 39 chemicals, such as algecides, slimisides, etc., are added from source 40, and after treatment, it is returned to the water inlet to atomizers 25 through line 42, using a pump if needed.

A tap water source 26' may be provided to add water to sump 39 if the water level should get too low. Also, a demister 44 may be provided in conduit 24 to prevent large water particles from entering environment 10.

FIG. 2 schematically illustrates another exemplary manner in which the method according to the present invention may be practiced. In this embodiment atomizers 25' are disposed directly in the textile processing environment 10'. Pure water is supplied to the atomizers 25' from the pure water supply 30. The pure water supply 45 may be obtained by treating tap water at the textile processing environment (as illustrated in FIG. 1), or the pure water may be provided from some extraneous supply. Distilled water, deionized water, demineralized . water, reverse osmosis water, boiler condensate water, and ultra-filtration water are all commonly pure enough to be considered "pure" water within the context of the present invention, and can achieve the desired apparent cotton dust level reductions and enhance textile processing efficiencies according to the invention. A tap water source 26" provides primary feed water for the pure water supply 45.

In a typical application of the present invention, a weaving room utilizing atomizers for providing humidification thereof was found to have an apparent cotton dust level of over 750 micrograms per cubic meter. According to the present invention, tap water from a city water supply was run through a conventional deionizer before being supplied to the atomizers. This step alone, while maintaining all other parameters essentially the same, resulted in a reduction of cotton dust concentration to the level of about 100 micrograms per cubic meter. At the same time, there was a small but noticeable improvement in weaving efficiency, believed due to fewer particles to interfere with weaving. The costs associated with providing and running the deionizer were the only costs necessary to achieve such significant advantageous results.

It will thus be seen that according to the present invention a simple and effective method has been provided for reducing apparent cotton dust concentrations to acceptable levels in textile processing room environments, while at the same time maintaining or increasing textile processing efficiencies. While the invention has been herein shown and described in what is presently conceived to be the most practical and preferred embodiment thereof, it will be apparent to those of ordinary skill in the art that many modifications may be made thereof within the scope of the present invention, which scope is to be accorded the broadest interpretation of the appended claims in order to encompass all equivalent methods and processes.

What is claimed is:

1. A method of maintaining low apparent cotton dust concentrations and proper humidity in a textile processing room environment, consisting essentially of the step of supplying pure water to atomizers which deliver water to the atmosphere in the textile processing room environment.

2. A method of maintaining proper humidity within a textile processing room environment, comprising the steps of: providing a humidification system for the textile processing room environment; providing a source of tap water at the textile processing room environment; treating the tap water from the tap water source at the textile processing room environment to produce pure water; and feeding only pure water, including that obtained from treatment of tap water, to the humidification system for humidifying the textile processing room environment.

3. A method as recited in claim 2 wherein said treating step is practiced by deionizing the tap water.

4. A method as recited in claim 2 wherein said treating step is practiced by demineralizing the tap water.

5. A method of treating the air in a textile weaving room environment comprising the steps of: providing atomizers in operative association with the weaving room environment for delivering atomized water into the weaving room atmosphere; and supplying only pure water to the atomizers to be delivered into the weaving room atmosphere.

6. A method of conditioning a textile processing room air supply, which supply if unconditioned will result in too high a concentration of apparent cotton dust in the textile processing room, utilizing an air conditioning system and a humidification system disposed in the air conditioning system, comprising the steps of:
   (a) withdrawing or returning air from the textile processing room with the air recirculating system;
   (b) supplying pure water to the humidification system;
   (c) effecting humidification of the air withdrawn from the textile processing room with the pure water delivered to the humidification systems; and
   (d) supplying the humidified air to the textile processing room environment.

7. A method as recited in claim 6 comprising the further steps of, between steps (a) and (d), filtering the withdrawn air, and mixing air from an exterior air source with the withdrawn air.

8. A method as recited in claim 7 wherein said filter step is practiced by passing the air through a V-cell lint-capture system.

9. A method as recited in claim 6 wherein the humidification system comprises a plurality of atomizers, and wherein step (b) is practiced by supplying pure water to the atomizers.

10. A method as recited in claims 1, 5, or 9 comprising the further steps of providing atomization of the humidifying water at an air conditioning humidification station, withdrawing excess water from the air conditioning humidification station, passing the excess water to a sump, adding algecide or like treatment chemicals to the water in the sump provided that the addition of such algecides or chemicals does not render the water impure, and returning the treated water from the sump to the atomizers.

11. A method as recited in claims 1, 5, or 9 wherein the step of supplying pure water to the atomizers is practiced by providing tap water to the environment, and effecting treatment of the tap water in the environment to make it pure for subsequent passage to the atomizers.

12. A method as recited in claim 11 wherein said effecting treatment step is practiced by deionizing the tap water.

13. A method as recited in claim 11 wherein said effecting treatment step is practiced by demineralizing the tap water.

14. A method of improving weaving efficiency by humidification of the weaving room atmosphere to a predetermined level with atomizers, wherein the improvement consists essentially of the step of delivering pure water to the atomizers for humidification of the air.

15. A method as recited in claims 1, 5, 4, or 13 wherein the pure water is selected from the group consisting essentially of deionized water, demineralized water, distilled water, reverse osmosis water, boiler condensate water, and ultra-filtration water.

* * * * *

UNITED STATES PATENT AND TRADEMARK OFFICE
CERTIFICATE OF CORRECTION

PATENT NO. : 4,753,663

DATED : June 28, 1988

INVENTOR(S) : John D. Neefus and Frederick M. Shofner

It is certified that error appears in the above-identified patent and that said Letters Patent is hereby corrected as shown below:

Column 6, line 55, the alternative dependency of claim 15 which reads "1, 5, 4, or 13" should read --1, 5, 6, or 14--.

Signed and Sealed this

Sixth Day of December, 1988

Attest:

DONALD J. QUIGG

Attesting Officer

Commissioner of Patents and Trademarks